(12) United States Patent
Thomas

(10) Patent No.: US 7,020,997 B1
(45) Date of Patent: Apr. 4, 2006

(54) SUPPORT SYSTEM FOR POTTED PLANTS

(75) Inventor: Martin B. Thomas, Georgetown, KY (US)

(73) Assignee: Container Slick, Inc., Georgetown, KY (US)

( * ) Notice: Subject to any disclaimer, the term of this patent is extended or adjusted under 35 U.S.C. 154(b) by 0 days.

(21) Appl. No.: 10/179,944

(22) Filed: Jun. 25, 2002

Related U.S. Application Data

(60) Provisional application No. 60/300,698, filed on Jun. 25, 2001.

(51) Int. Cl.
*A47G 7/00* (2006.01)

(52) U.S. Cl. .......................................... 47/39
(58) Field of Classification Search ............... None
See application file for complete search history.

(56) References Cited

U.S. PATENT DOCUMENTS

| | | | | |
|---|---|---|---|---|
| 3,542,210 A | | 11/1970 | Sorensen | |
| 3,667,159 A | * | 6/1972 | Todd | 47/87 |
| 3,712,252 A | * | 1/1973 | Huang | 111/105 |
| 3,810,329 A | * | 5/1974 | Lecuru et al. | 47/87 |
| 3,825,126 A | * | 7/1974 | Pohl et al. | 211/85.23 |
| 4,197,674 A | * | 4/1980 | Blackmore, Jr. | 47/73 |
| 4,684,013 A | * | 8/1987 | Jacobs | 206/423 |
| 4,756,119 A | | 7/1988 | Chabot | |
| 4,793,097 A | | 12/1988 | Whitcomb | |
| 4,982,527 A | * | 1/1991 | Sprung | 47/59 R |
| 5,022,183 A | * | 6/1991 | Bohlmann | 47/86 |
| 5,426,890 A | * | 6/1995 | Dummen | 47/87 |
| 5,467,555 A | * | 11/1995 | Ripley et al. | 47/65.9 |
| 5,581,936 A | * | 12/1996 | Belgiorno | 47/65.5 |
| 5,649,386 A | | 7/1997 | Rynberk | |
| 5,664,370 A | | 9/1997 | Boudreau et al. | |
| 5,836,105 A | * | 11/1998 | Loosen | 47/39 |
| 5,890,318 A | * | 4/1999 | Hammerle | 47/87 |
| 6,125,577 A | * | 10/2000 | Merzweiler et al. | 47/39 |
| 6,237,286 B1 | * | 5/2001 | Williams | 47/66.5 |
| 6,601,342 B1 | * | 8/2003 | Dummen | 47/62 C |
| 6,622,423 B1 | * | 9/2003 | Riccardi | 47/1.1 |
| 2002/0035803 A1 | * | 3/2002 | Dummen | 47/73 |

FOREIGN PATENT DOCUMENTS

| | | | | |
|---|---|---|---|---|
| CH | 661406 A5 | * | 7/1987 | |
| DE | 19844020 A1 | * | 4/2000 | |
| FR | 2707134 A1 | * | 1/1995 | |
| FR | 002707134 A1 | * | 1/1995 | 47/39 |
| JP | 405007428 A | * | 1/1993 | 47/66.1 |

* cited by examiner

*Primary Examiner*—Francis T. Palo
(74) *Attorney, Agent, or Firm*—King & Schickli, PLLC

(57) ABSTRACT

A support system for supporting at least one plant contained in a pot is provided comprising a tray having an outer wall, an inner wall defining a receptacle for a pot, and an insulating interstitial space therebetween. The tray may include interlocking means allowing several trays to interlock into a single continuous unit. In another aspect, the present invention provides a support system as described including an integral fluid delivery system for providing a fluid to individual receptacles. A rack system for transporting multiple trays is also provided. In addition, a method of completing an inventory of plants contained in the trays of the invention is disclosed.

8 Claims, 8 Drawing Sheets

SUPPORT SYSTEM FOR POTTED PLANTS

This application claims the benefit of U.S. Provisional Patent Application Ser. No. 60/300,698, filed Jun. 25, 2001.

TECHNICAL FIELD

The present invention relates in general to a support for plants. The invention relates more particularly to a support system for use in supporting plants contained in pots, concurrently maintaining the plants in an upright position and providing proper spacing for optimal plant growth.

BACKGROUND OF THE INVENTION

Plant nurseries, garden centers, and the like require means to store and display plants. It is impractical for these businesses to grow a plant destined for sale in the ground, as this would require digging up the plant to transfer to the customer, increasing labor costs and risking damage to the plant. Accordingly, it is common practice to place plants in pots for growth, storage and display prior to sale to a consumer.

There are disadvantages to simply placing a plant in a pot and placing the pot out on a shelf or on the ground for display. The pot may be jostled and overturned by customers, or wind may cause the pot to overturn, breaking the pot and potentially damaging the plant. It also is known in this art that individual plants require specific amounts of space for optimum growth. Often, inexperienced personnel will place potted plants in too close a proximity to one another, creating overcrowding and competition between plants for available sunlight and space. This may result in stunted growth or death of individual plants.

Plant nurseries and garden centers often construct attractive, elaborate displays of plants to entice customers to purchase particular plants. Often, these displays are seasonal (for example, the sale of poinsettias is greatest during the Christmas season), and when the season has passed, new plants are brought in for different displays. Each individual potted plant remaining must therefore be moved, requiring additional time and labor expense. Like any other business, plant nurseries and garden centers also must maintain a count of their inventory, in this case of the number of plants of different types on hand. Difficulties are associated with conducting an inventory of plants in individual pots, as individual pots may be moved by customers or store personnel, resulting in an inaccurate count.

Accordingly, there is need in the art for a support system for potted plants which retains potted plants in an upright position regardless of wind, jostling, and the like, and which provides optimal spacing between potted plants placed therein. There is additional need for a support system which facilitates the transport of groups of potted plants from place to place, either within or between particular retail establishments selling plants. Advantageously, the support system should provide protection from hostile climate conditions, thereby allowing storage of plants therein in conditions of extreme cold or heat.

SUMMARY OF THE INVENTION

In accordance with the purposes of the present invention as described herein, the support of the present invention is constructed to be used in conjunction with plants contained in pots. In one aspect, the device of this invention comprises a tray having at least one outer wall, a at least one inner wall, and a transitioning surface extending between the at least one outer wall and at least one inner wall. The inner wall should define a sidewall of a receptacle adapted to receive a plant pot. An interstitial space between the outer wall and inner wall is maintained for receiving an insulating substance. Typically, the receptacle for receiving a potted plant may include a bottom, and may further include at least one interior rib structure to support a pot placed therein. The receptacle to receive a potted plant may also include at least one aperture for purposes of drainage and/or airflow.

In another aspect, the support system of the present invention includes a means for interlocking a plurality of trays into a substantially continuous structure. In a presently preferred embodiment, the means for interlocking a plurality of trays may be a raised, hollow ridge formed on at least one side of the tray. The raised, hollow ridge is configured to accept a similar raised, hollow ridge on at least one side of a horizontally adjacent tray in a nested or tongue-and-groove fashion. It will be appreciated by those of skill in the art that by interlocking a plurality of horizontally adjacent trays, a substantially continuous structure of any desired size may be formed.

Other means of interlocking horizontally adjacent trays may be suitable, such as for example cooperating apertures in adjacent trays which may be aligned to engage a pin, a clip, or a nut and bolt. It will also be appreciated that such apertures may also serve to fasten the tray of this invention to a supporting surface, such as the ground or a shelf, thereby providing further stability to the plant pots received therein.

In yet another aspect, this invention provides a support system for potted plants whereby potted plants contained therein may be supplied with water. In a presently preferred embodiment, the tray of this invention includes an integral means for delivering a fluid such as water to each receptacle for receiving a potted plant. Typically, the means for delivering a fluid comprises a main branch having an inlet for attaching a fluid source, an axial, substantially hollow passageway, and an outlet. The main branch may be in fluid communication with at least one secondary, substantially hollow branch which may extend laterally from the main branch and pass in substantial proximity to each receptacle. In a typical configuration, a means is provided for delivering a quantity of fluid from the secondary branch directly to each individual receptacle, and to a potted plant received therein. Any suitable delivery means may be utilized, such as a nipple and drip waterer of known design in fluid communication with the secondary branch, and extending from the secondary branch to the receptacle. It will be appreciated that this feature allows direct delivery of a predetermined quantity of fluid to each plant pot received in the tray, thereby reducing wastage. It will also be appreciated that a predetermined quantity of fluid may be delivered to any desired number of trays by connecting a water source to the inlet of a first tray, by connecting the outlet of the first tray to the inlet of a horizontally adjacent second tray (which may be interlocked with the first tray as described above), and so on.

In yet still another aspect, the instant invention provides a rack system for transporting and displaying a plant pot, comprising a bottom shelf and a plurality of vertical posts for supporting at least one vertically adjacent shelf. The bottom shelf and vertically adjacent shelf may include a first surface for supporting a tray as described above. The bottom shelf and vertically adjacent shelf may also include a second surface, typically perpendicular to the first surface, adapted to engage a carrying means to allow lifting and transport of the entire rack system to any desired location.

As noted above, the tray of the present invention may include a plurality of apertures for engaging a vertical post. Accordingly, the present invention provides a rack system wherein a bottom shelf as described is used to support a tray for receiving a potted plant. In operation, the tray is placed on the bottom shelf whereby the apertures for engaging a vertical post on the tray and the bottom shelf are substantially aligned, and at least one vertical post is used to secure the tray to the bottom shelf. Typically, a vertical post will be located at multiple locations of the tray and bottom shelf, such as at the four corners of a rectangular design. The vertical posts may then be used to secure at least one vertically adjacent shelf in place, and a second tray containing potted plants may then be placed thereon. Of course, the vertical posts may also secure the vertically adjacent shelf and tray in place, preventing inadvertent displacement of a tray. These steps may be repeated to add additional vertically adjacent shelves.

In still yet another aspect of the present invention, a method of inventory of potted plants is provided, comprising the steps of placing a plurality of pots in at least one tray having a plurality of receptacles for receiving a predetermined number of plant pots. The method further comprises placing the pots in preselected receptacles, in accordance with the growth requirements of the plants and the amount of space required to meet these growth requirements. Plants of a particular type, in accordance with their growth requirements, may be placed in a tray with a predetermined number of receptacles left empty between adjoining plants, forming a specific pattern. It will be appreciated that in this manner, the number of plant pots in a tray will always be known. A desired reference character, corresponding to the pattern in which the pots are placed in the tray, may be placed on the tray in accordance with the number of pots therein, for example by labeling, or by molding the reference character directly on the tray. It will be appreciated that an individual desiring to inventory the number of pots on hand need only count the number of trays containing pots and multiply by the predetermined number of pots received by each tray, thereby significantly reducing the time and labor involved in inventorying individual plants in pots.

Other objects and applications of the present invention will become apparent to those skilled in this art from the following description wherein there is shown and described a preferred embodiment of this invention, simply by way of illustration of the modes currently best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and, together with the description, serves to explain the principles of the invention. In the drawing.

Reference will now be made in detail to the presently preferred embodiments of the invention, examples of which are illustrated in the accompanying drawing.

DETAILED DESCRIPTION OF THE INVENTION

Figure 1:
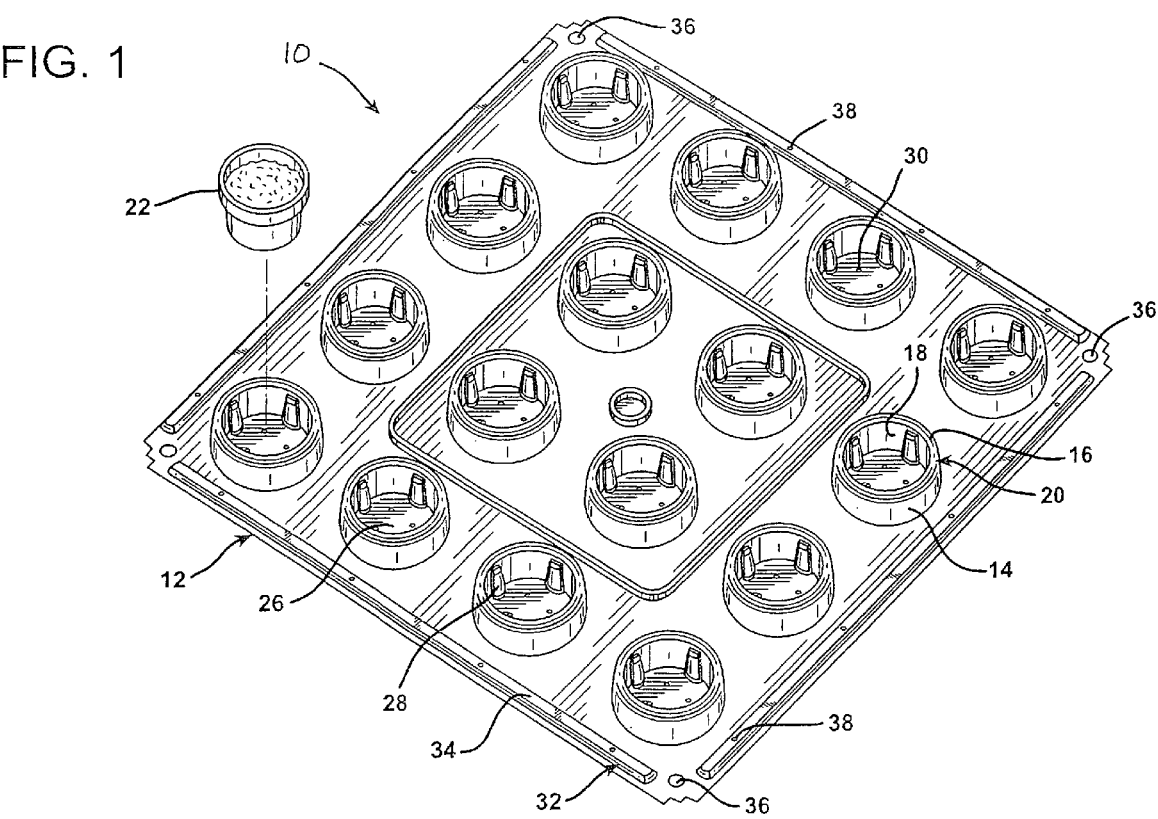
FIG. 1 is a perspective view of one embodiment of the support system of the present invention.
Figure 2:
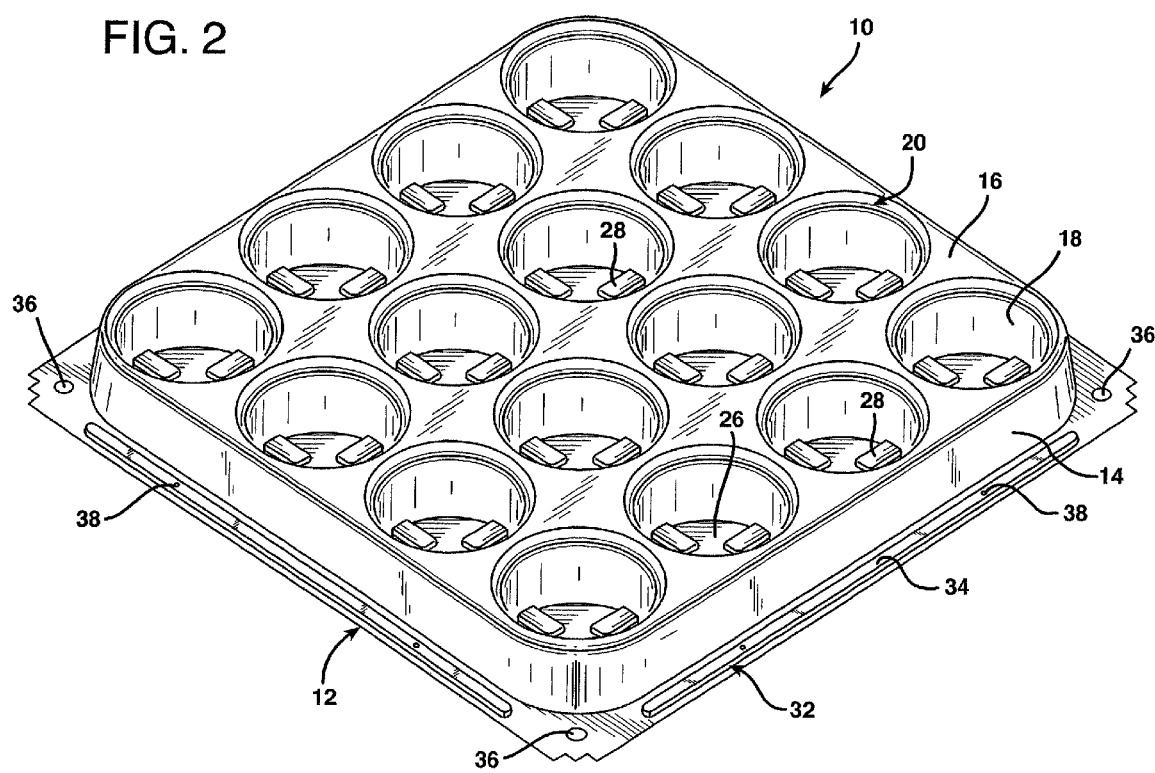
FIG. 2 is a perspective view of a second embodiment of the support system of the present invention.
Figure 3:
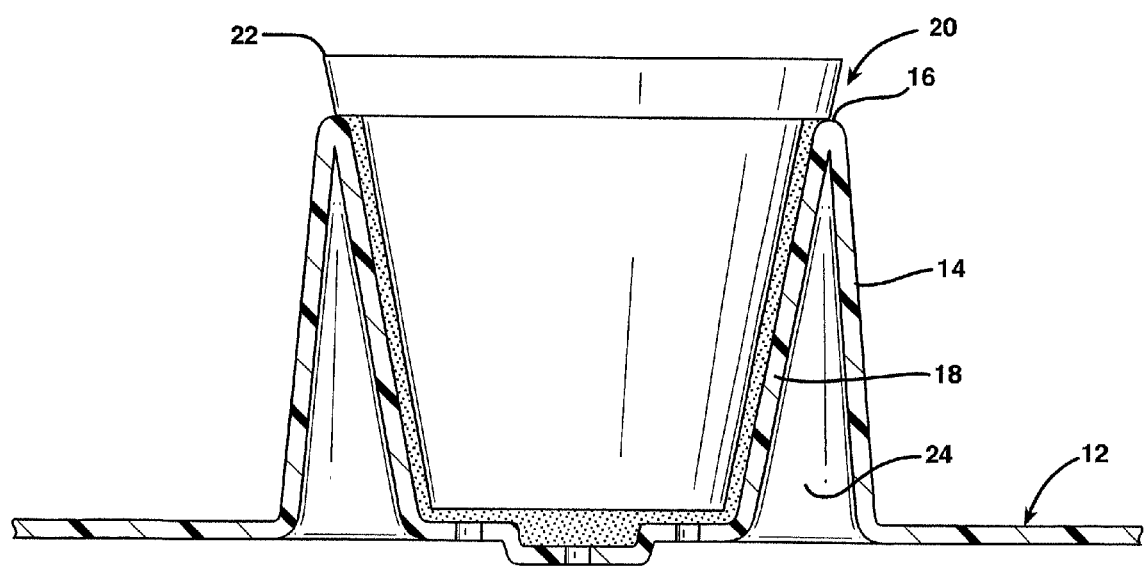
FIG. 3 is a side view of a receptacle of the support system of the present invention, showing in cross-section the interstitial space for receiving an insulating substance between the outer and inner wall of the receptacle.

Referring to FIGS. 1 and 2, the support system 10 for potted plants of the present invention comprises a tray 12 having at least one outer wall 14, a transitioning surface 16, and at least one inner wall 18. The inner wall 18 defines a sidewall of a receptacle 20 adapted to receive a plant pot 22. An interstitial space 24 (see FIG. 3) between the outer wall 14 and inner wall 18 is maintained for receiving an insulating substance. It will be appreciated that the insulating substance of choice may be determined by the degree of insulation to be provided. For example, air may be used as the insulating substance. In a situation where a greater degree of insulation is desired, a solid insulator such as, for example, a fiberglass-based insulation may be included. Those of skill in the art will realize that this feature allows the support system 10 to be used to store and display plants in less that optimum climatic conditions, such as in extremes of heat and cold.

It will also be appreciated that the dimensions of interstitial space 24 will determine the amount of insulating material which may be included therein, and thereby will partially determine the insulating capacity thereof. In one embodiment of the invention as shown in FIG. 1, the interstitial space 24 between outer wall 14 and inner wall 18 is relatively small, and a correspondingly lesser amount of insulating material may be included. In the embodiment of the invention depicted in FIG. 2, a larger interstitial space 24 is provided between outer wall 14 and inner walls 18, thereby allowing a correspondingly greater amount of insulating material to be included.

In a preferred embodiment, tray 12 is solid. Use of a solid tray 12 provides a further advantage. In storing and displaying potted plants, particularly when displaying the plants on the ground, it is desirable to reduce or eliminate the growth of weeds and other plant matter near the pots. Unchecked growth of undesirable plant matter is unattractive, and further the unwanted plants may, in the course of reproducing, establish in the pots, thereby competing for water and soil nutrients in the pots and possibly reducing the value of the more desirable plants contained therein. The solid tray 12 substantially prevents sunlight from reaching the ground immediately below the tray, thereby creating an inhospitable environment for plant growth. Accordingly, unwanted plant growth near the tray 12 is discouraged, as the tray 12 serves as its own "weed mat."

Typically, the receptacle 20 for a receiving a potted plant 22 will include a bottom 26, and may further include at least one interior rib 28 to support a single pot 22 placed therein, whereby substantially the entirety of the outer periphery of the pot 22 nests with the receptacle 20 and is positioned substantially equidistant from the receptacle 20 sidewall, to assist in maintaining proper drainage from and airflow around pot 22. Interior rib 28 may be vertical as in FIG. 1, or horizontal as in FIG. 2. The receptacle 20 to receive a potted plant 22 may also include at least one aperture 30 for purposes of drainage and/or airflow. Support system 10 may be formed of any suitable material, such as, e.g. plastic, polymers, or lightweight metal. The support system 10 may be a vacuform plastic or polymer sheet. Alternatively, the support system 10 may be formed of injection molded plastic or polymer.

Accordingly, as shown in FIG. 1, each potted plant 22 placed in a receptacle 20 is maintained in an upright position, and remains upright even if the pot is jostled, windblown, or the like. Apertures 30 in the receptacles 20 provide drainage, allowing plants placed in receptacles 20 to be watered without necessitating removal of plant pots, reducing the labor required. A plurality of pots placed in a tray 12 may be moved as a unit, also reducing labor in transport of the pots to or from a desired position in a nursery or garden.

The receptacles 20 may be of any desired size or shape, depending upon the size or shape of the pot 22 required for the plant to be grown therein. It will also be appreciated that receptacles 20 on the tray 12 may be spaced thereon in accordance with the growth requirements of the plants growing therein. Therefore, trays 12 fabricated to receive smaller plants (which require less space for growth) may have receptacles 20 placed in closer proximity to one another, while trays 12 fabricated to receive larger plants requiring increased growth space may have receptacles 20 spaced correspondingly farther apart from one another. Alternatively, a preselected number of receptacles 20 may be left empty between adjoining plants. Thus, overcrowding of plants resulting in impaired growth is avoided.

Figure 4:
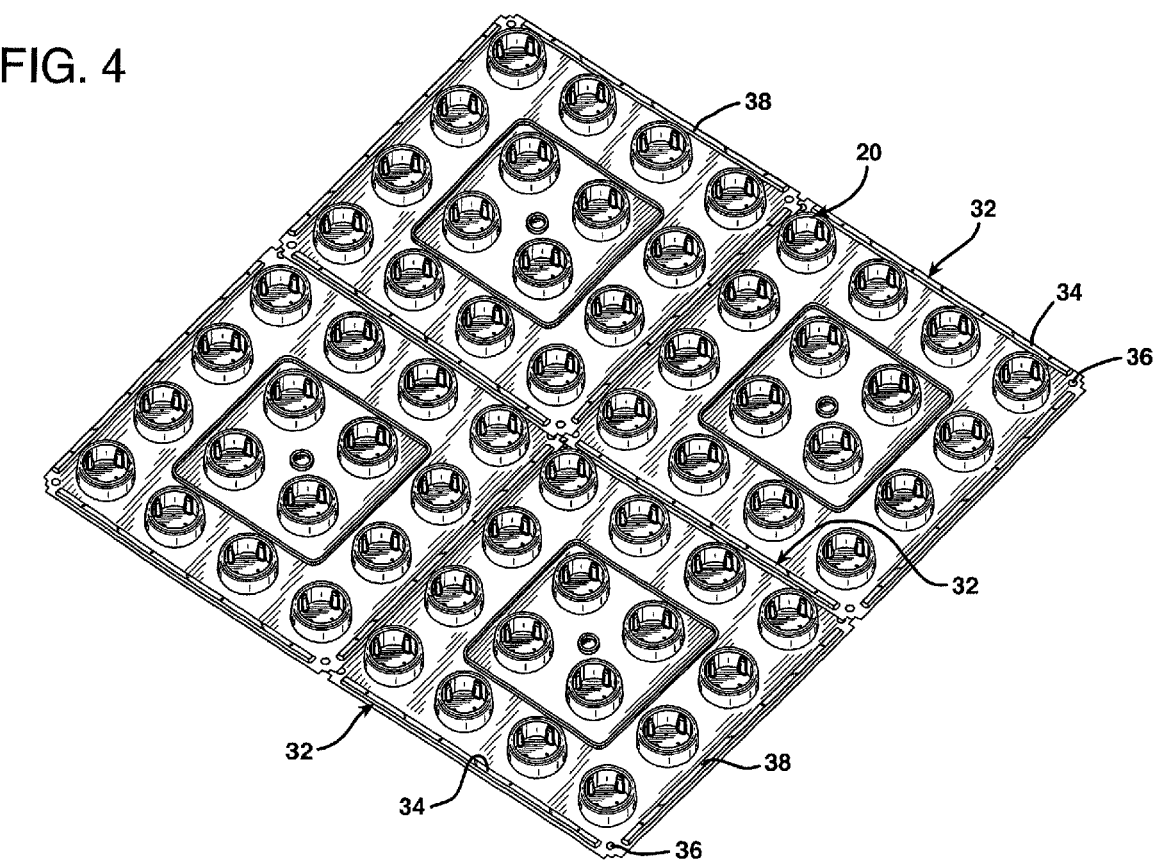
FIG. 4 is a perspective view of the support system of the present invention, showing a plurality of horizontally adjacent trays in an interlocked configuration.

In another aspect, the support system 10 of the present invention includes a means 32 for interlocking a plurality of trays 12 into a substantially continuous structure as shown in FIG. 4. In a presently preferred embodiment, the means for interlocking a plurality of trays 12 is a raised, hollow ridge 34 formed on at least one side of the tray 12. The raised, hollow ridge 34 is configured to accept a similar raised, hollow ridge 34 on at least one side of a horizontally adjacent tray 12 in a nested or tongue-and-groove fashion. It will be appreciated by those of skill in the art that by interlocking a plurality of horizontally adjacent trays 12, a substantially continuous structure of any desired size may be formed.

Those of skill in the art can also appreciate that interlocking a plurality of trays 12 provides an additional advantage. Particularly in cases where plants are placed on open ground, even in the individual trays 12 of the present invention, undesirable plant material such as weeds may grow therebetween. In addition to creating an unsightly display which may discourage consumers from buying the plants, certain weeds may potentially contaminate the potted plants as described above. As noted in the foregoing description the supports 10 may be interlocked to form a substantially continuous structure. Advantageously, when placed on open ground, the substantially continuous structure formed by interlocking one or more of the trays 12 of this invention creates a larger barrier to the growth of other undesired plant materials such as weeds. Because trays 12 are physically interlocked, there are no intervening gaps therebetween through which weeds may grow.

Other means of interlocking horizontally adjacent trays may be suitable, such as for example cooperating apertures 36 in horizontally adjacent trays 12 for receiving a pin, a stake, a clip, or a nut and bolt (not shown). It will also be appreciated, and described in further detail in the disclosure below, that such apertures 36 may also serve to fasten the tray of this invention to a supporting surface, such as the ground or a shelf, thereby providing further stability to the plant pots received therein. Additional apertures 38 may be provided through ridges 34 for receiving a pin or stake (not shown). Thus, interlocking adjacent trays 12 using ridges 34 such that apertures 36 and 38 are substantially aligned, followed by driving pins or stakes (not shown) through apertures 36 and 38 into the ground or a supporting shelf allows a plurality of interlocked adjoining trays 12 to be secured to an underlying support as well as to one another. Accordingly, further stability for the support system 10 of the present invention is thereby achieved.

Figure 5A:
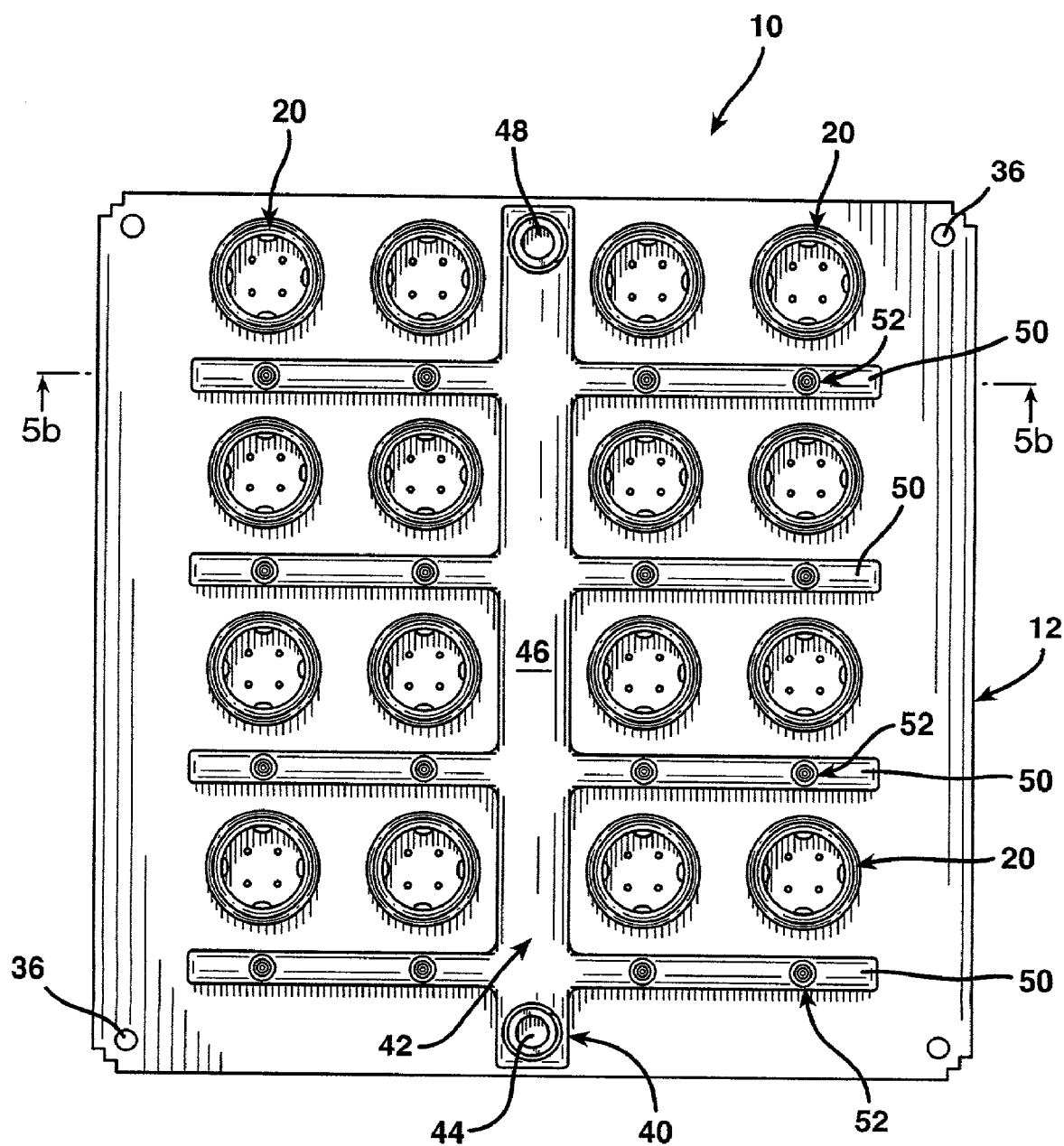
FIG. 5a is a top plan view of the support system of the present invention, showing the integral fluid delivery system.
Figure 5B:
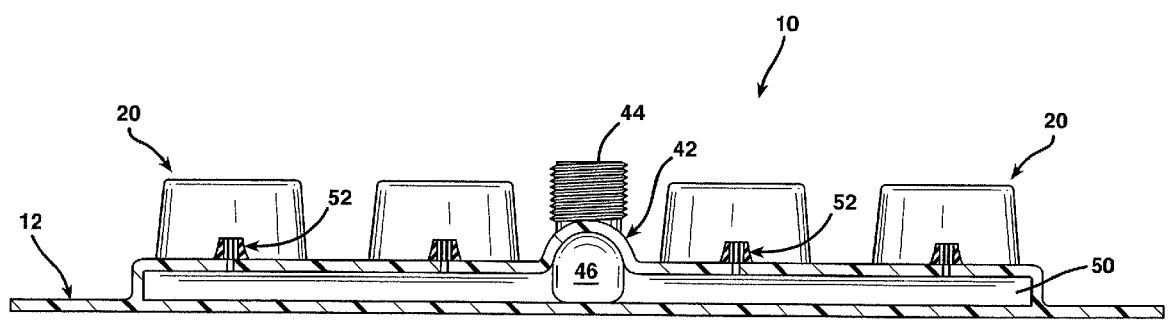
FIG. 5b is a side view of the support system of the present invention, showing the integral fluid delivery system in partial cross-section.

In yet another aspect, best seen in FIGS. 5a and 5b, this invention provides a support system 10 for potted plants whereby potted plants contained therein may be supplied with a fluid. In a presently preferred embodiment, the tray 12 of this invention includes an integral means 40 for delivering a fluid such as water to each receptacle 20 for receiving a potted plant. Typically, the means 40 for delivering a fluid comprises a main branch 42 having an inlet 44 for attaching a fluid source (not shown), an axial, substantially hollow passageway 46, and an outlet 48. Any suitable configuration for attaching, e.g., a hose to inlet 44 and outlet 48 may be utilized, such as a threaded attachment, a nipple, or a quick-release fastener.

Figure 6:
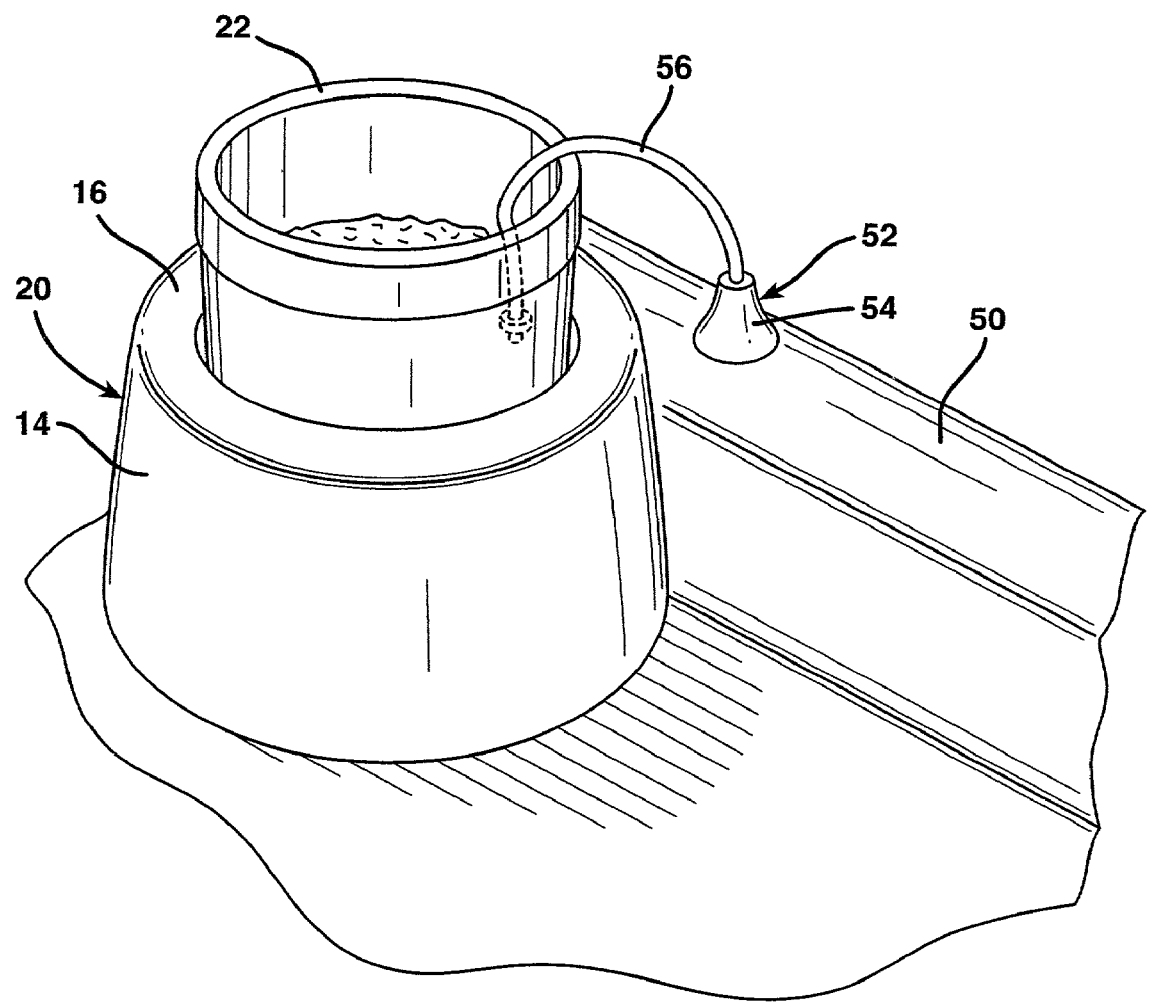
FIG. 6 is a perspective view of a drip watering system for delivering fluid from a secondary branch of the integral watering system to a pot contained in a receptacle.

The main branch 42 may be in fluid communication with at least one secondary, substantially hollow branch 50 which may extend laterally from the main branch 42 along the plane of tray 12, and pass in substantial proximity to a receptacle 20. As shown in FIG. 6, in a typical configuration, a means 52 is provided for delivering a quantity of fluid from the secondary branch 50 directly to each individual receptacle 20, and to a potted plant received therein. Any suitable delivery means may be utilized, such as an outlet 54 and drip hose 56 of known design in fluid communication with the secondary branch 50, and extending from the secondary branch 50 to the receptacle 20. It will be appreciated that this feature allows direct delivery of a predetermined quantity of fluid to each plant pot received in the tray 12, thereby preventing overwatering and underwatering.

It will also be appreciated that a predetermined quantity of fluid may be delivered to any desired number of trays 12 by simply connecting a fluid source (not shown) to the inlet 44 of a first tray 12, by connecting the outlet 48 of the first tray 12 to the inlet 44 of a horizontally adjacent second tray 12 with, for example, a suitable length of hose (which may be interlocked with the first tray 12 as described above), and so on. Accordingly, a plurality of integral water delivery means 40 on adjoining interlocked trays 12 may be placed in fluid communication with one another. It will further be appreciated that a plurality of trays 12, interlocked and placed in fluid communication as described hereinabove, may thus be supplied with fluid by a single supply source connected to a first inlet 44 on a first tray 12. Accordingly, the labor and cost of supplying fluid to a large number of potted plants may be significantly reduced by use of the present invention. Those of skill in the art will realize that it is possible to further reduce the labor and cost involved in watering plants contained in the instant invention by commonly known means, such as a dedicated water supply controlled by a timer.

Figure 7:
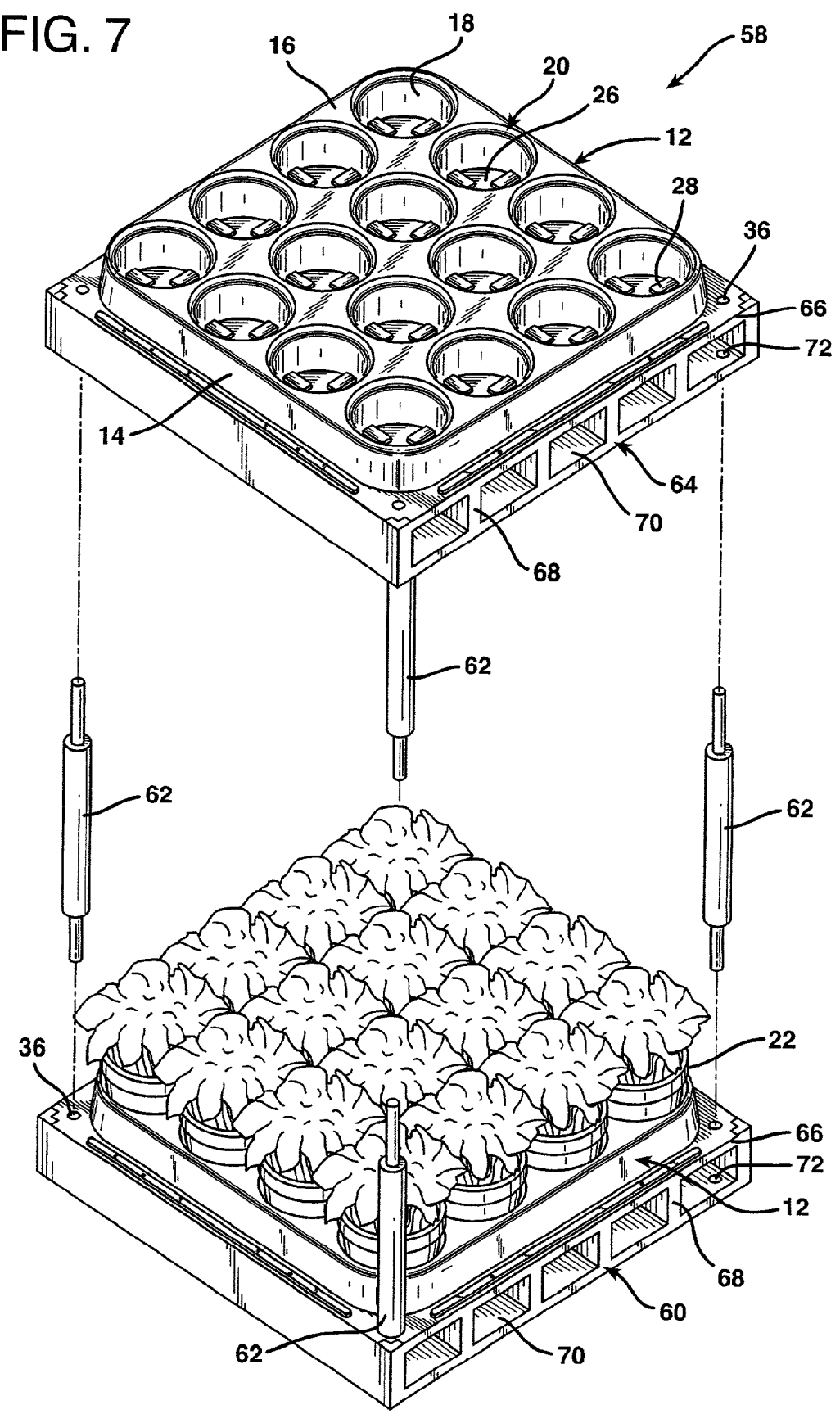
FIG. 7 is an exploded perspective view of the rack system of the present invention.

In yet still another aspect as shown in FIG. 7, the present invention provides a rack system 58 for transporting and displaying a plant pot 22 received in a tray 12, comprising a bottom shelf 60 and a plurality of vertical posts 62 for supporting at least one vertically adjacent shelf 64. The bottom shelf 60 and vertically adjacent shelf 64 may be dimensioned appropriately to support individual trays 12, or may be dimensioned to support a plurality of trays 12 interlocked as described above. The bottom shelf 60 and vertically adjacent shelf 64 may include a first surface 66 for supporting a tray 12 as described above. The spacing between shelves 60, 64 may be adjusted by using longer or shorter posts 62 depending upon the clearance necessary to support the growth requirements of the plants being grown therein. The bottom shelf 60 and vertically adjacent shelf 64 may also include a second surface 68, typically perpendicular to the first surface 66, having slots 70 adapted to engage a carrying means (not shown) to allow lifting and transport of the entire rack system 58 to any desired location. Typically, the carrying means of choice will be the blades of a conventional fork lift (not shown). The bottom shelf 60 and vertically adjacent shelf 64 may also include at least one aperture 72 for engaging a vertical post 62.

As noted above, the tray 12 of the present invention may include a plurality of apertures 36 for engaging a vertical post 62. Accordingly, the present invention provides a rack system 58 wherein a bottom shelf 60 as described is used to support a tray 12 for receiving a potted plant 22. In operation, a tray 12 is placed on the bottom shelf 60 so that the apertures 36 on tray 12 and apertures 72 on bottom shelf 60 are substantially aligned, and at least one vertical post 62 is inserted therethrough to secure the tray 12 to the bottom shelf 60. Typically, a vertical post 62 will engage multiple locations of the tray 12 and bottom shelf 60, such as at the four corners of a rectangular design as shown in FIG. 7. At least one vertically adjacent shelf 64 may then be installed so that vertical posts 62 engage apertures 72 therethrough, and a second tray 12 containing potted plants 22 may then be placed thereon and secured with additional vertical posts 62, or with a pin (not shown) if additional vertically adjacent shelves 64 will not be installed. These steps may be repeated to add additional vertically adjacent shelves 64. Accordingly, it will be appreciated that the rack system 58 of the present invention provides a means for transporting a plurality of trays 12, with plant pots 22 therein, to and from any desired location with significantly less labor and time expenditures.

In still yet another aspect of the present invention, a method of inventory of potted plants is provided, comprising the steps of placing a plurality of pots 22 in at least one tray 12 having a plurality of receptacles 20 for receiving a predetermined number of plant pots 22. The method further comprises placing the pots 22 in preselected receptacles 20, in accordance with the growth requirements of the plants and the amount of space required to meet these growth requirements. Plants of a particular type, in accordance with their growth requirements, may be placed in a tray 12, with a predetermined number of receptacles 20 left empty between adjoining plants, forming a specific pattern. It will be appreciated that in this manner, the number of plant pots 22 in an individual tray 12 will always be known. A desired reference character, corresponding to the pattern in which the pots 22 are placed in the tray 12, maybe placed on the tray 12 in accordance with the number of pots 22 therein, for example by labeling, or by molding the reference character directly into the material of the tray 12. It will be appreciated that an individual desiring to inventory the number of pots 22 on hand need only count the number of trays 12 containing pots 22 and multiply by the predetermined number of pots 22 received by each tray 12, thereby significantly reducing the time and labor involved in inventorying individual potted plants.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention when interpreted in accordance with the breadth to which it is fairly, legally, and equitably entitled.

The invention claimed is:

1. A support system for a plant pot comprising:
a tray comprising at least one outer wall, at least one inner wall, a transitioning surface extending between the at least one outer wall and at least one inner wall, and an interstitial space between the outer and inner wall for receiving an insulating substance;
wherein said inner wall defines at least one sidewall of a receptacle for receiving a single pot whereby substantially the entirety of a periphery of the pot nests with the receptacle and is substantially equidistant from the receptacle sidewall;
further wherein said tray includes means for interlocking a plurality of trays in a side-by-side orientation.

2. The support system of claim 1, wherein said receptacle includes a bottom.

3. The support system of claim 2, wherein said receptacle bottom includes at least one aperture therethrough for drainage.

4. The support system of claim 2, wherein the receptacle includes at least one interior rib structure for supporting a plant pot whereby substantially the entirety of the pot outer periphery is positioned in a spaced relationship from at least the receptacle bottom.

5. The support system of claim 1, wherein said means for interlocking a plurality of trays comprises at least one raised, substantially hollow ridge on an edge of said tray for interlocking with a raised, substantially hollow ridge on an edge of a horizontally adjacent tray.

6. The support system of claim 1, wherein said tray includes at least one aperture on an outer rim for receiving a pin or post therethrough.

7. A support system for a plant pot comprising:
a tray comprising a surface having an interstitial space for receiving an insulator;
wherein said tray defines at least one sidewall of a receptacle for receiving a single pot;
further wherein an edge of said tray includes at least one raised, substantially hollow ridge for interlocking with a raised, substantially hollow ridge on an edge of an adjacent tray in a side-by-side orientation to form a barrier for substantially preventing growth of plant matter therethrough.

8. The support system of claim 1, wherein said adjacent interlocked trays form a barrier for substantially preventing growth of plant matter therethrough.

\* \* \* \* \*